United States Patent
Goodnow et al.

(10) Patent No.: US 8,103,388 B2
(45) Date of Patent: Jan. 24, 2012

(54) SYSTEM FOR PREDICTION AND COMMUNICATION OF ENVIRONMENTALLY INDUCED POWER USEAGE LIMITATION

(75) Inventors: Kenneth J. Goodnow, Essex, VT (US);
Stephen G. Shuma, Underhill, VT (US);
Peter A. Twombly, Shelburne, VT (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 12/361,699

(22) Filed: Jan. 29, 2009

(65) Prior Publication Data

US 2010/0191385 A1 Jul. 29, 2010

(51) Int. Cl.
*G05D 3/12* (2006.01)
*G05D 5/00* (2006.01)
*G05D 7/00* (2006.01)
*G06F 1/26* (2006.01)
*G06F 1/32* (2006.01)
*H02J 1/10* (2006.01)

(52) U.S. Cl. ........ 700/291; 700/284; 700/286; 700/294; 700/295; 713/300; 713/320; 307/52

(58) Field of Classification Search ............... 700/286, 700/291, 293; 307/52; 713/300, 320
See application file for complete search history.

(56) References Cited

U.S. PATENT DOCUMENTS

| | | | |
|---|---|---|---|
| 5,033,112 A | 7/1991 | Bowling et al. | |
| 5,572,438 A | 11/1996 | Enlers et al. | |
| 5,696,695 A | 12/1997 | Enlers et al. | |
| 5,806,006 A | 9/1998 | Dinkins | |
| 6,529,839 B1 | 3/2003 | Uggerud et al. | |
| 6,832,135 B2 * | 12/2004 | Ying | 700/295 |
| 7,096,034 B2 | 8/2006 | Zhang et al. | |
| 7,155,912 B2 * | 1/2007 | Enis et al. | 60/652 |
| 7,248,978 B2 | 7/2007 | Ronsom | |
| 7,312,006 B2 | 12/2007 | Yamagata et al. | |
| 7,720,576 B2 * | 5/2010 | Warren et al. | 700/286 |
| 2005/0043862 A1 * | 2/2005 | Brickfield et al. | 700/295 |
| 2006/0195229 A1 * | 8/2006 | Bell et al. | 700/286 |
| 2009/0094173 A1 * | 4/2009 | Smith et al. | 705/412 |

OTHER PUBLICATIONS

Sharma, et al., "Balance of Power, Dynamic Thermal Management for Internet Data Centers," Thermal-Load Balancing, IEEE Internet Computing, Jan.-Feb. 2005, pp. 42-49.

Pater, et al, "Energy Aware Grid: Global Workload Placement based on Energy Efficiency," 2002, pp. 1-9.

* cited by examiner

*Primary Examiner* — Kakali Chaki
*Assistant Examiner* — Sivalingam Silvanesan
(74) *Attorney, Agent, or Firm* — Gibb I.P. Law Firm, LLC

(57) ABSTRACT

Disclosed are a power management system and associated method that not only initiate a "greenout" to avoid the negative impact of high loads (i.e., to avoid high power cost, negative environmental impact, brownouts, and ultimately blackouts), but can also predict the initiation of such a "greenout". Predicting the initiation of a "greenout" and communicating the prediction to one or more of the various electronic devices connected to the power grid allows the electronic device(s) to take preparatory action to avoid and/or limit any negative impact that may be caused by the "greenout".

21 Claims, 3 Drawing Sheets

SYSTEM FOR PREDICTION AND COMMUNICATION OF ENVIRONMENTALLY INDUCED POWER USEAGE LIMITATION

BACKGROUND

1. Field of the Invention

The embodiments of the invention generally relate to power management systems and, more specifically, to a smart power management system that initiates a voluntary reduction in overall power consumption in response to one or more detected conditions and further predicts the occurrence of such conditions in order to take preparatory actions.

2. Description of the Related Art

As demands for electricity increase, the ability of the existing power infrastructure to service high loads becomes more tentative. The impacts of such high loads can be felt in many ways, depending upon whether the load is near or exceeds the capacity of the power infrastructure. For example, as the load nears capacity the backup power sources (e.g., coal or diesel fired generators) can be brought on-line, however, such backup power sources are typically less efficient and bad for the environment. Also, as the load nears capacity (e.g., during known peak use periods), the cost to consumer can be increased. Thus, if power usage remains high during peak load/peak cost periods, prohibitive expense can be incurred and environmental impact realized. As the load reaches or exceeds capacity, "brownouts" can occur (i.e., the supply voltage can be reduced). At the extreme, "blackouts" can occur (i.e., all power can be switched off). If "brownouts" or "blackouts" are experienced, the impact to electrical systems can be catastrophic (e.g., loss of data, corruption of data, system failure, etc.).

To address such concerns, power management techniques have been developed that allow users to initiate a voluntary and, optionally, automatic reduction in power consumption in response to one or more detected conditions within their local domain/grid. Such a voluntary reduction in power consumption is used to avoid the negative impact of high loads (i.e., to avoid high power cost, negative environmental impact, brownouts, and ultimately blackouts) and will hereafter be referred to as a "greenout". Unfortunately, reactionary "greenouts" can also have negative consequences. Thus, it would be advantageous over the prior art to provide a power management system that can not only initiate a "greenout" to avoid the impact of high loads, but can predict the initiation of such a "greenout" and take preparatory action to avoid and/or limit any negative impact that may be caused by the "greenout".

SUMMARY

In view of the foregoing, disclosed herein are embodiments of a power management system and associated method that not only initiate a "greenout" to avoid the negative impact of high loads (i.e., to avoid high power cost, negative environmental impact, brownouts, and ultimately blackouts), but can also predict the initiation of such a "greenout". Predicting the initiation of a "greenout" and communicating the prediction to one or more of the various electronic devices connected to the power grid allows the electronic device(s) to take preparatory action to avoid and/or limit any negative impact that may be caused by the "greenout".

More particularly, disclosed herein are embodiments of a power management system that comprises a plurality of electronic devices, a power grid that supplies power to the electronic devices, and a processor. The system embodiments can also comprise a communication network that allows communication between the processor and the electronic devices.

In one embodiment of the power management system, the processor receives data from one or more data sources regarding the power grid. The processor analyzes the data in order to generate a prediction as to an occurrence, at a future time, of a set of at least one condition that will trigger a voluntary reduction in overall power consumption by the electronic devices. The processor then communicates the generated prediction, over the communication network, to at least one electronic device so as to allow the at least one electronic device to take at least one predetermined preparatory action in response to the prediction. Once the set of conditions actually occurs, the voluntary reduction in overall power consumption by the electronic devices is implemented (e.g., by either a power grid controller or the electronic devices themselves), according to a predetermined reduction in power consumption scheme.

In another embodiment of the power management system, the processor similarly receives data from one or more data sources regarding the power grid. In this case, the processor analyzes the data in order to generate a prediction as to the occurrence, at a future time, of a set of at least one condition that will trigger a particular severity level of voluntary reduction in overall power consumption by the electronic devices. The processor then selects at least one electronic device, depending upon the particular severity level, and communicates the prediction, over the communication network, to the selected electronic device(s) so as to allow the selected electronic device(s) to take at least one predetermined preparatory action in response to the prediction. Once the set of conditions actually occurs, the particular severity level of voluntary reduction in overall power consumption by the electronic devices is implemented (e.g., by either a power grid controller or the electronic devices themselves), according to a predetermined reduction in power consumption scheme.

Also disclosed herein are embodiments of an associated power management method. The method embodiments comprise receiving data regarding a power grid that supplies power to a plurality of electronic devices. The data can be received from one or more different data sources. Then, the data is analyzed in order to generate a prediction as to the occurrence, at a future time, of a set of at least one condition that will trigger a voluntary reduction in overall power consumption by the electronic devices connected to the power grid. Optionally, this prediction will be as to the occurrence, at a future time, of a set of at least one condition that will trigger a particular severity level of voluntary reduction in overall power consumption by the electronic devices connected to the power grid. Next, the prediction is communicated, over the communication network to one or more selected electronic device(s) so as to allow the electronic device(s) to take at least one predetermined preparatory action in response to the prediction. It should be noted that, in the case where the prediction includes a particular severity level, selection of the electronic device(s) to which the prediction is communicated and the preparatory action taken by the electronic device(s) may vary depending upon the particular severity level. Once the set of conditions actually occurs, the voluntary reduction in overall power consumption by the electronic devices is implemented (e.g., by either a controller or the electronic devices themselves), according to a predetermined reduction in power consumption scheme.

Also disclosed herein are embodiments of a computer program product for power management. The computer program product comprises a computer usable medium having computer usable program code embodied therewith and this computer usable program code is configured to perform the above-described method embodiments.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

Figure 1:
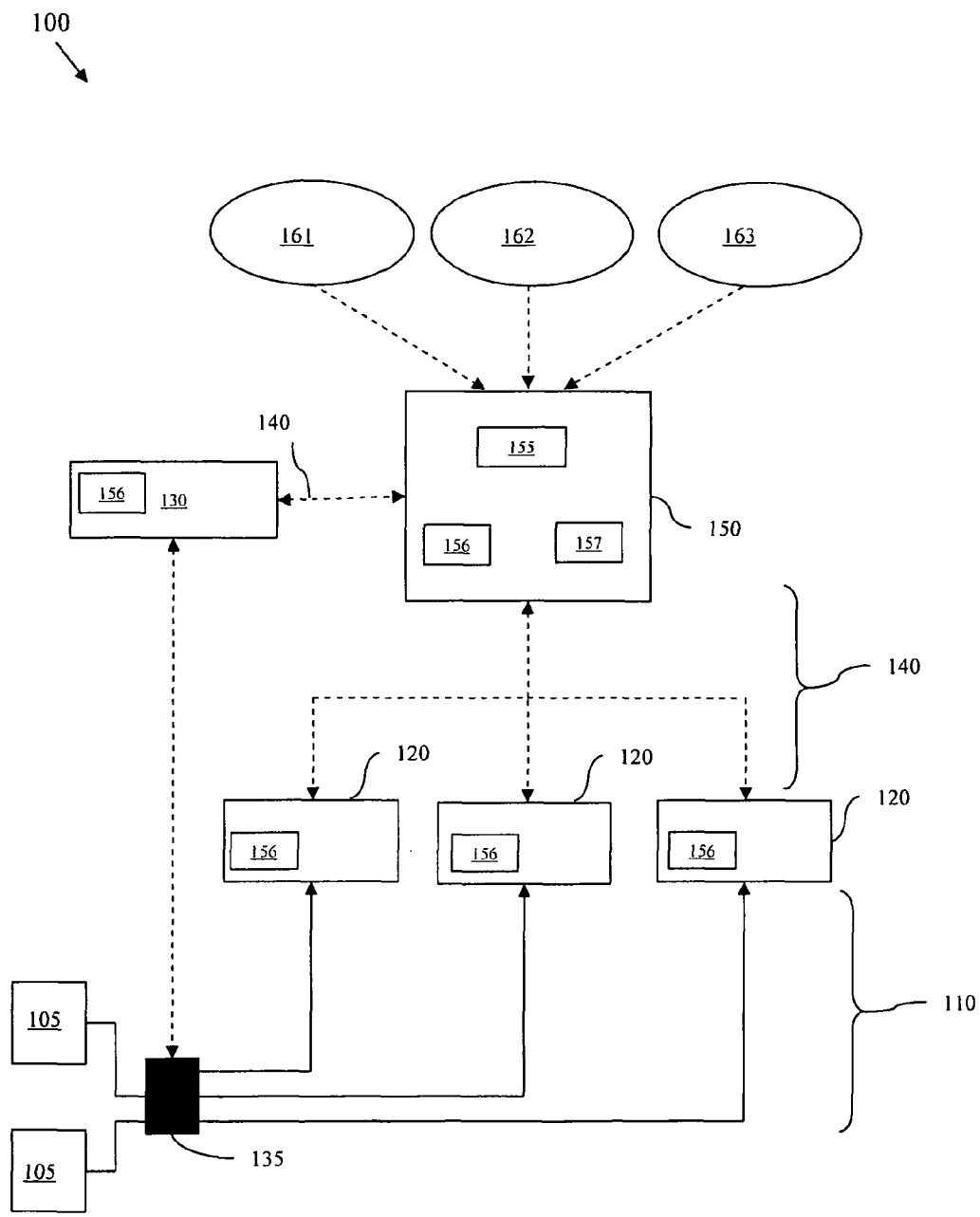
FIG. 1 is a schematic diagram illustrating an embodiment of a power management system.

The embodiments of the invention and the various features and advantageous details thereof are explained more fully with reference to the non-limiting embodiments that are illustrated in the accompanying drawings and detailed in the following description.

As mentioned above, with ever increasing demands for electricity, the ability of the existing power infrastructure to service high loads becomes more tentative. The impacts of such high loads can be felt in many ways, depending upon whether the load is near or exceeds the capacity of the power infrastructure. For example, as the load nears capacity the backup power sources (e.g., coal or diesel fired generators) can be brought on-line, however, such backup power sources are typically less efficient and bad for the environment. Also, as the load nears capacity (e.g., during known peak use periods), the cost to consumer can be increased. Thus, if power usage remains high during peak load/peak cost periods, prohibitive expense can be incurred and environmental impact realized. As the load reaches or exceeds capacity, "brownouts" can occur (i.e., the supply voltage can be reduced). At the extreme, "blackouts" can occur (i.e., all power can be switched off). If "brownouts" or "blackouts" are experienced, the impact to electrical systems can be catastrophic (e.g., loss of data, corruption of data, system failure, etc.).

To address such concerns, power management techniques have been developed that allow users to initiate a voluntary and, optionally, automatic reduction in power consumption (e.g., shutting down of electronic device, limiting the number of electronic devices in operation at any one time, limiting the amount of power used by each device, etc.) in response to one or more detected conditions within their local domain/grid (e.g., in response to detected voltage changes or rate changes). Such a voluntary reduction in power consumption is used to avoid the negative impact of high loads (i.e., to avoid high power cost, negative environmental impact, brownouts, and ultimately blackouts) and will hereafter be referred to as a "greenout". Unfortunately, reactionary "greenouts" can also have negative consequences. For example, a "greenout" may result in the automatic shutdown of some, if not all, electronic devices in a particular location. If the electronic device being shutdown is a computer system critical data may be lost or corrupted. If the electronic device being shutdown is a temperature control system (e.g., an air conditioner), ambient temperature may reach unsuitably high levels. Furthermore, "greenouts" are initiated in reaction to detected conditions, not predicted conditions. This reactionary approach can lead to disruptions in operation, contention for resources, and/or machine down time.

In view of the foregoing, disclosed herein are embodiments of a power management system and associated method that not only initiate a "greenout" to avoid the negative impact of high loads (i.e., to avoid high power cost, negative environmental impact, brownouts, and ultimately blackouts), but can also predict the initiation of such a "greenout". Predicting the initiation of a "greenout" and communicating the prediction to one or more of the various electronic devices connected to the power grid allows the electronic device(s) to take preparatory action to avoid and/or limit any negative impact that may be caused by the "greenout".

More particularly, referring to FIG. 1, disclosed herein are embodiments of a power management system 100 that comprises a plurality of electronic devices 120 and a power grid 110 that supplies power from one or more power sources 105 to the electronic devices 120. The system 100 embodiments can also comprise a processor 150 and a communication network 140 that allows communication between the processor 150 and other components of the power management system 100, including but not limited to, the electronic devices 120. The processor 150 can comprise, for example, a computer process unit (CPU), a state machine or any other suitable device capable of performing processing functions. Additionally, the physical location of the processor 150 within the power management system can vary depending upon whether the power management system 100 is implemented on a macro or micro level (see discussion below). For example, on a macro level the processor may be located at a power plant or at the same site or building where the electronic devices are located. On a micro level the processor may be located within a computer system or on a system-on-chip (SOC) containing the electronic devices. Similarly, the type of communication network 140 will vary depending upon whether the power management system 100 is implemented on a macro or micro level (see discussion below) and may comprise, for example, a local area network (LAN), a wide area network (WAN), the internet, wired or wireless phone lines and/or a wired system bus.

In operation, the processor 150 receives data regarding and/or affecting the power grid 110. The data can be received from a variety of different types of data sources, including: monitors 161, forecasters 162, and historical databases 163. Specifically, the data can be received from one or more monitors 161 that monitor one or more external factors affecting the power grid 110. Such monitors 161 can, for example, comprise one or more monitors that track temperature across the power grid area, a monitor that tracks overall load on the power grid, a clock that indicates current date/time, etc. The data can also be received from one or more forecasters 162 that predict the occurrence of external factors affecting the power grid 110. Such forecasters 162 can, for example, comprise a weather forecaster or a load forecaster. Finally, the data can be received from one or more historical databases 163 related to grid performance. Such historical databases 163 can indicate, for example, grid reliability in the presence of external factors, such as extreme weather conditions or high loads, and also historical relationships between external factors, such as between load and cost, temperature and cost, date/time and load, date/time and temperature, temperature increase/hour metrics for given times of year, etc.

The processor 150 then analyzes the data in order to generate a prediction as to an occurrence, at a future time, of a set of conditions. That is, the processor 150 analyzes the monitored data, the forecasted data and/or the historical data, according to a predetermined and preloaded prediction scheme 155, in order to predict if a predetermined set of conditions will occur. This predetermined set of conditions is that set of one or more conditions that is predetermined to trigger a voluntary reduction in overall power consumption by the electronic devices 120, according to a predetermined reduction in power consumption scheme 156, in order to avoid high power cost, negative environmental impact, a brownout and/or a blackout.

It should be noted that the predetermined reduction in power consumption scheme 156 will specify the amount by which overall power consumption should be voluntarily reduced and the plan for accomplishing the such a reduction (e.g., by shutting down of one or more specified electronic devices, limiting the number of electronic devices in operation at any one time, limiting the amount of power used by each device, etc.). See detailed discussion below regarding the implementation of the reduction in power consumption scheme 156.

Optionally, the prediction that is generated by the processor 150 will include a time when the set of condition(s) triggering the "greenout" will occur (i.e., a time until the occurrence of the set of conditions triggering the "greenout") and/or a time period during which the set of condition(s) will be maintained (i.e., an estimated duration of the set of conditions).

Also, optionally, the processor 150 can analyze the data in order to generate a prediction as to an occurrence, at a future time, of a particular set of conditions that will trigger, not only a voluntary reduction in overall power consumption by the electronic devices 120, but rather a particular severity level of voluntary reduction in overall power consumption. That is, as discussed above, voluntary reductions in overall power consumption by devices 120 on a power grid 110 (i.e., "greenouts") are used to avoid the negative impact of high loads. The severity level of a "greenout" may vary as a function of the particular negative impact that is trying to be avoided, for example, mild in order to avoid high power cost or negative environmental impact, medium in order to avoid a brownout, or severe in order to avoid a blackout. Thus, the occurrence of different sets of conditions can be used to trigger different severity levels of "greenout". For example, a rate change alone may trigger a mild "greenout", a combination of load value and temperature may trigger a medium "greenout" and a combination of load value, temperature, and grid reliability data may trigger a severe "greenout". Furthermore, the predetermined reduction in power consumption scheme 156 can specify different amounts by which overall power consumption by the electronic devices 120 should be reduced and different plans for accomplishing the specified voluntary reduction, depending upon the severity level.

Also, optionally, the predetermined prediction scheme 155 can be adaptive. That is, with each triggered "greenout", the processor 150 can analyze captured data that preceded the occurrence of the set of conditions triggering the "greenout" and use the results of such an analysis to update and, thereby, improve the prediction scheme 155.

Once a "greenout" is predicted by the processor 150, the processor 150 can communicate the prediction over the communication network 140 to one or more of the electronic devices 120 so as to allow the electronic device(s) to take preparatory action to avoid and/or limit any negative impact that may be caused by the "greenout". In one embodiment, the processor 150 can be preloaded with a predetermined preparatory action scheme 157 that specifies what, if any, actions should be preformed by each of the electronic devices 120 in order to prepare for the impending "greenout". In response to the prediction and based on this preparatory action scheme 157, the processor 150 can select which electronic device(s) should receive the prediction and can communicate the prediction over the communication network 140 to the selected electronic device(s) 120, along with instructions as to what preparatory actions are necessary to prepare for the impending "greenout". The preparatory actions can comprise specified actions that will avoid and/or limit any negative impact that may be caused by the "greenout". That is, these preparatory actions can be designed to optimize efficiency and ensure a smooth transition to the reduced power limits which will accompany the "greenout" situation once it is realized. To that end, maintenance of critical data and system operation must be ensured (e.g., by automatically backing up data in currently running applications to prevent loss, by automatically rearranging task schedules to ensure critical tasks are performed prior to the "greenout", by automatically activating temperature control systems to adjust ambient temperature below or above normal, etc.). Other preparatory actions can be designed to inform users of the impending "greenout" (e.g., an electronic device 120, such as a telephone, PDA, email device, computer or television, can be instructed to generate a message notifying a user of the impending "greenout"). Once notified of the impending "greenout", a user may choose to take some preparatory action. For example, the user may choose to perform a given task earlier rather than later (e.g., wash laundry) or change a recording time on a DVR. It should be noted that the selection of which electronic device(s) 120 will receive the prediction can be specified in the predetermined preparatory action scheme 157 and, if applicable, can depend upon the particular severity level of "greenout". It should also be noted that the predetermined preparatory action that is taken can vary, according to the preparatory action scheme 157, depending on the time until and/or the estimated duration of the set of conditions that will trigger the "greenout".

Alternatively, in another embodiment, the processor 150 can communicate the prediction directly to each of the electronic device(s) 120 over the communication network 140. Each of the electronic device(s) can be pre-loaded with the predetermined preparatory action scheme 157 and the electronic device(s) can act accordingly to prepare for the impending "greenout".

Additionally, the processor 150 can continue to analyze the data in order to eventually detect the actual occurrence of the set of condition(s). Once the set of condition(s) actually occurs and is detected by the processor 150, the voluntary reduction in power consumption scheme 156 can be implemented. In one embodiment, the voluntary reduction in power consumption scheme 156 is implemented through the use of a power grid system controller 130. This controller 130 can contain the processor 150 as an integral component, can be contained within the processor 150, or can be in communication with the processor 150 over the communication network 140 (as illustrated). In any case, the processor 150 can communicate a notification as to the actual occurrence of the set of condition(s) to the controller 130 and, in response, the controller 130 can automatically limit the power supplied to selected electronic device(s) over the power grid 110 (e.g., through the use of a switching circuit 135). The process of limiting the power supplied to the selected electronic device (s) can be performed by the controller 130, according to a predetermined reduction in power consumption scheme 156 preloaded onto the controller 130. This reduction in power consumption scheme 156 can, for example, prioritize the electronic devices 120 and further specify which electronic devices 120, during the "greenout", should be exempted from the "greenout" conditions, which should have a limited power supply and by how much, which should have no power supply, etc. Optionally, the plan for voluntarily reducing overall power consumption by the electronic devices 120 may vary, according to the reduction in power consumption scheme 156, depending upon the estimated duration of the voluntary reduction in power consumption (i.e., the estimated duration of the "greenout") and/or the severity level of the "greenout".

Alternatively, once the set of condition(s) actually occurs and is detected by the processor 150, the processor 150 can communicate a notification as to the occurrence of the set of conditions(s) directly to of electronic devices 120 over the communication network 140. Then, the electronic devices 120 themselves can automatically limit their own power usage. Power usage by the electronic devices 120 can be limited according to a predetermined reduction in power consumption scheme 156 that is preloaded onto each of the electronic devices 120. The reduction in power consumption scheme 156 can, for example, prioritize the electronic devices and further specify which electronic devices 120, during the "greenout", should be exempted from the "greenout" conditions, which should have limited power usage and by how much, which should have no power usage, etc. For example, in the case of a processor, power usage can be reduced by reducing clock frequency; in the case of a water heater or washer, power usage can be reduced by reducing the desired water temperature, etc. Again, optionally, the plan for voluntarily reducing overall power consumption by the electronic devices 120 may vary, according to the scheme 156, depending upon the estimated duration of the voluntary reduction in power consumption (i.e., the estimated duration of the "greenout") and/or the severity level of the "greenout".

The power management system 100 of the present invention can further take advantage of the communication network 140 between the various system components, including the processor 150, the electronic devices 120 and the controller 130 in order to provide features not previously available with prior art "greenout" techniques. Specifically, by allowing communication back and forth between the various components 120, 130 and 150, particular aspects of a voluntary reduction in power consumption scheme 156 can be overridden (e.g., until such time as the appropriate preparatory or other actions are completed by the electronic device(s) 120) or even altered. For example, the processor 150 can further receive a notification from each electronic device 120 as to the status of that particular device's compliance with the predetermined preparatory action scheme 156 (e.g., incomplete, time until completion, completed, etc.). If the status of a particular device is incomplete, the processor 150 can notify the power grid controller 130 to override the voluntary reduction in power consumption scheme 156 as it applies to that particular device until such time as the status is complete (e.g., until data is backed-up, until critical tasks are performed according to a rearranged schedule, until ambient temperature reaches a desired temperature, etc.). Additionally, if an electronic device is targeted for shutdown by the power consumption reduction scheme 156 and if that electronic device is also scheduled to perform a high priority task during the "greenout", this information may be communicated over the network 140 to the processor 150 and onto the controller 130 and the controller 130 can alter the voluntary reduction in power consumption scheme 156 in order to ensure that the necessary power consumption reduction occurs and that the high priority task is completed (e.g., by targeting a different device for shutdown). For example, the voluntary reduction in power consumption scheme 156 may specify that both a television and a digital video recorder (DVR) are to be shutdown during a "greenout". However, if the DVR is scheduled to record a program during the "greenout" period and if the recording task is designated as having a high priority by the user, this information can be communicated to the controller 130. The controller 130 can then alter the plan for reducing overall power consumption to ensure the necessary power consumption reduction and also to ensure that the program is recorded (e.g., by targeting a washer and not the DVR for shutdown).

As described above, the power management system 100 according to the present invention can be applied on a macro-level. That is, the power management system 100 can be employed with a power grid 110 that supplies power to electronic devices 120 dispersed over a large geographic area, over an individual building or site (e.g., a home or office), etc. However, it is anticipated that the power management system 100 can also be applied on a micro-level. That is, the power management system 100 can be employed with a power grid that supplies power to electronic devices 120 dispersed over a single electronic system (e.g., a personal computer or a single system-on-chip (SOC)).

For example, the power management system 100 can comprise a power grid 110 that supplies power to one or more application processors 120 within a single personal computer or SOC. This personal computer or SOC may be tasked to maintain a certain power level and, more specifically, tasked to not exceed that certain power level, regardless of operational requests. In such a situation, power consumption by the computer or SOC that reaches a threshold level below the maximum allowable power consumption level may trigger a "greenout" in order to avoid reaching the maximum allowable level. This "greenout" may take the form of limiting and/or ceasing application request processing by the application processor(s) 120. Thus, the power management system processor 150 must be able to predict when such a threshold power consumption level will occur. To do this, the power management system processor 150 will receive monitored and historical data 161,163. The monitored and historical data can be related to the application processing requests (e.g., number of requests, sizes of the requests, estimated processing time for each of the requests, etc.). Based on the data and according to a predetermined prediction scheme 155, the power management system processor 150 will generate a prediction as to when the threshold power consumption limit that will trigger the "greenout" will occur. Once generated, the prediction along with preparatory action instructions (e.g., request processing scheduling changes) can be communicated by the power management system processor 150 over the communication network 140 to the application processors 120 to ensure that critical application processing takes place prior to the "greenout".

In another example, the power management system 100 can comprise a power grid 110 that supplies power to various electronic devices on a SOC, including but not limited to a SOC processor/state machine, a memory (e.g., a static random access memory (SRAM)) and a high-speed serial link. In the same manner as on a macro level, the processor 150 analyzes monitored data (e.g., current temperature and loads), the forecasted data (e.g., weather forecasts) and/or the historical data (e.g., historical reliability and/or relational data, such as a temperature increase/hour metric for a given time of year), according to a predetermined and preloaded prediction scheme 155, in order to predict if, when and for how long a predetermined set of conditions will occur. This predetermined set of conditions is that set of one or more conditions that is predetermined to trigger a voluntary reduction in overall power consumption by the electronic devices 120 on the SOC. The predetermined reduction in power consumption scheme 156 will specify the amount by which overall power consumption should be reduced and the plan for accomplishing the specified power consumption reduction. Preparatory actions taken by the SOC processor/state machine, in response to the prediction and according to the preparatory action scheme 157, could include, for example, queue flushing and preparing to change from a multi-thread operation mode (high power) to a single thread operation mode (low power). Preparatory actions taken by the SRAM, in response to the prediction and according to the preparatory action scheme 157, could include, for example, operations flushing in concert with queue flushing by the processor/state machine and preparing to change from a time-division multiplexing mode (i.e., a high power mode of operating on both clock edges) to a normal single-edge triggered mode. Finally, preparatory actions taken by the HSS link, in response to the prediction and according to the preparatory action scheme 157, could include, for example, working in concert with the SRAM and processor/state machine to complete current operations and then switching from a dual data rate mode to a single data rate mode.

Figure 2:
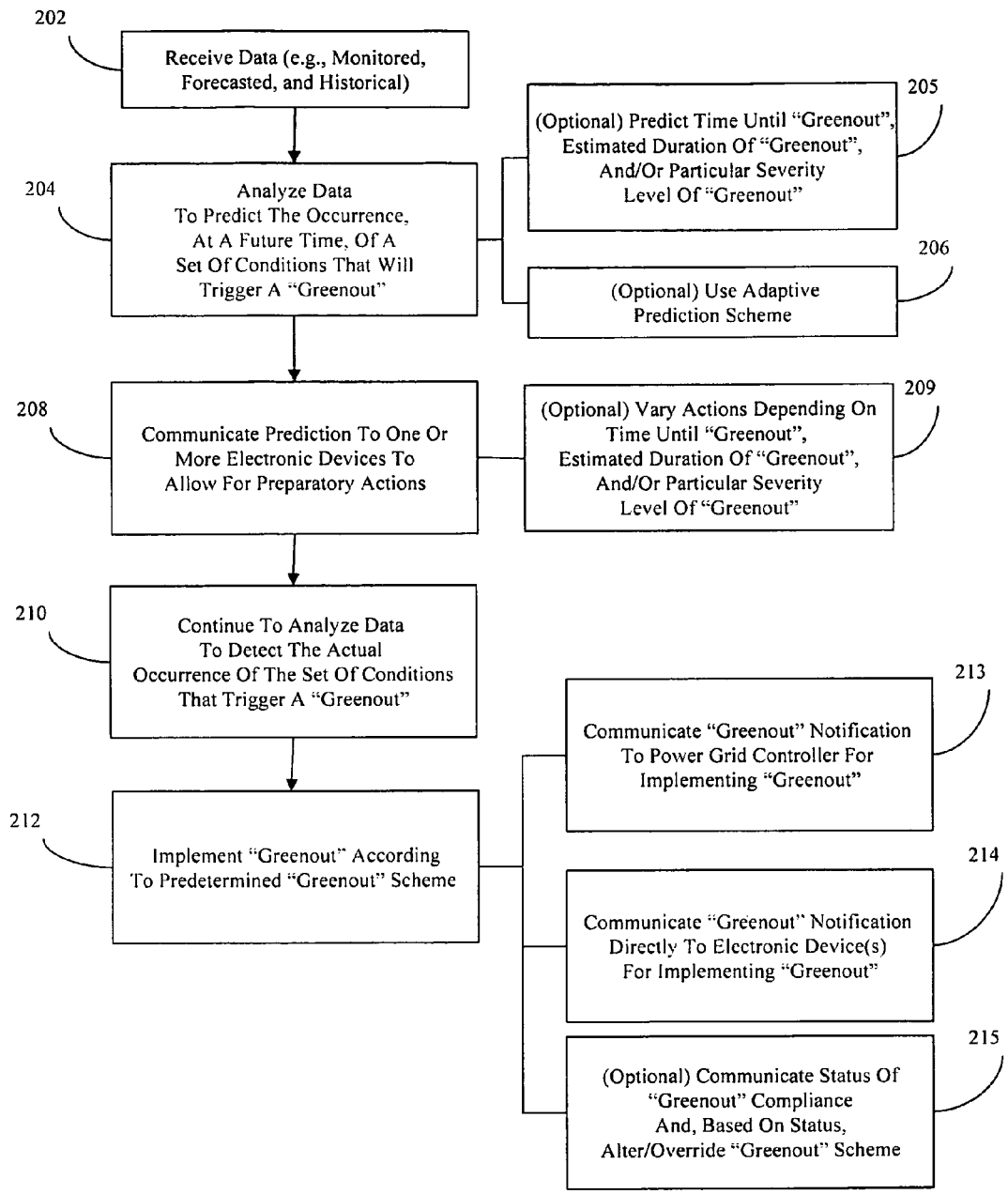
FIG. 2 is a flow diagram illustrating an embodiment of a power management method.

Referring to FIG. 2 in combination with FIG. 1, also disclosed herein are embodiments of an associated power management method. The method embodiments comprise receiving data regarding and/or affecting a power grid 110 that supplies power to a plurality of electronic devices 120 (202). The data can be received from a variety of different types of data sources, including: monitors 161, forecasters 162, and historical databases 163. Specifically, the data can be received from one or monitors 161 that monitor one or more external factors affecting the power grid 110. Such monitors 161 can, for example, comprise one or more monitors that track temperature across the power grid area, a monitor that tracks overall load on the power grid, a monitor that tracks date and time, etc. The data can also be received from one or more forecasters 162 that predict the occurrence of external factors affecting the power grid 110. Such forecasters 162 can, for example, comprise a weather forecaster or a load forecaster. Finally, the data can be received from one or more historical databases 163 related to grid performance. Such historical databases 163 can indicate, for example, grid reliability in the presence of external factors, such as extreme weather conditions or high loads, and also historical relationships between the monitored and/or forecasted external factors, such as between load and cost, temperature and cost, date/time and load, date/time and temperature, temperature increase/hour metrics for given times of year, etc.

Then, the data can be analyzed in order to generate a prediction as to the occurrence, at a future time, of a set of conditions that will trigger a voluntary reduction in overall power consumption by the electronic devices 120 connected to the power grid 110 (i.e., that will trigger a "greenout") (204). That is, the monitored data, the forecasted data and/or the historical data are analyzed at process 204 according to a predetermined prediction scheme 155, in order to predict if a predetermined set of conditions will occur. This predetermined set of conditions is that set of one or more conditions that is predetermined to trigger a voluntary reduction in overall power consumption by the electronic devices 120, according to a predetermined reduction in power consumption scheme 156, in order to avoid high power cost, negative environmental impact, a brownout and/or a blackout. The predetermined reduction in power consumption scheme 156 will specify the amount by which overall power consumption should be reduced and the plan for accomplishing the specified power consumption reduction (e.g., by shutting down of one or more specified electronic devices, by limiting the number of electronic devices in operation at any one time, by limiting the amount of power used by each device, etc.).

The analysis process 204 can comprise a number of optional features. For example, optionally, the prediction at process 204 will include a time when the set of condition(s) triggering the "greenout" will occur (i.e., a time until the occurrence of the set of conditions) and/or a time period during which the set of condition(s) will be maintained (i.e., an estimated duration of the set of conditions) (205). Optionally, the prediction at process 204 will also include a particular severity level of the voluntary reduction in overall power consumption (205). Specifically, as discussed above, voluntary reductions in overall power consumption by devices 120 on a power grid 110 or "greenouts" are used to avoid the negative impact of high loads. The severity level of a "greenout" may vary as a function of the particular negative impact that is being avoided, for example, mild in order to avoid high power cost or negative environmental impact, medium in order to avoid a brownout, or severe in order to avoid a blackout. Thus, the occurrence of different sets of conditions can be used to trigger different severity levels of "greenout". For example, a rate change alone may trigger a mild "greenout", a combination of load value and temperature may trigger a medium "greenout" and a combination of load value, temperature, and grid reliability data may trigger a severe "greenout". Furthermore, the predetermined reduction in power consumption scheme 156 can specify different amounts by which overall power consumption by the electronic devices 120 should be reduced and different plans for accomplishing the specified voluntary reduction, depending upon the severity level. Finally, optionally, the analysis process will be performed using a predetermined prediction scheme 155 that is adaptive (206). That is, with each triggered "greenout", the processor 150 can further analyze captured data that preceded the "greenout" and use the results of such an analysis to update and, thereby, improve the prediction scheme 155.

Next, the prediction is communicated to one or more of the electronic devices 120, over the communication network 140, so as to allow the selected electronic device(s) 120 to take at least one predetermined preparatory action in response to the prediction (208). Instructions as to the required preparatory actions to be taken by each electronic device 120, as indicated in a predetermined preparatory action scheme 157, can be communicated to the electronic devices 120 along with the prediction or, alternatively, stored within the electronic devices 120 themselves. These preparatory actions can comprise specified actions that will avoid and/or limit any negative impact that may be caused by the "greenout". That is, these preparatory actions can be designed to optimize efficiency and ensure a smooth transition to the reduced power limits which will accompany the "greenout" situation once it is realized. To that end, maintenance of critical data and system operation must be ensured (e.g., by automatically backing up data in currently running applications to prevent loss, by automatically rearranging task schedules to ensure critical tasks are performed prior to the "greenout", by automatically activating temperature control systems to adjust ambient temperature below or above normal, etc.). Other preparatory actions can be designed to inform users of the impending "greenout" (e.g., an electronic device 120, such as a telephone, PDA, email device, computer or television, can be instructed to generate a message notifying a user of the impending "greenout"). Once notified of the impending "greenout", a user may choose to take some preparatory action. For example, the user may choose to perform a given task earlier rather than later (e.g., wash laundry) or change a recording time on a DVR. It should be noted that the selection of which electronic device(s) 120 will receive the prediction can be specified in the predetermined preparatory action scheme 157 and, if applicable, can depend upon the particular severity level of "greenout". It should also be noted that the predetermined preparatory action that is taken can vary, according to the preparatory action scheme 157, depending on the time until and/or the estimated duration of the set of conditions that will trigger the "greenout" (209).

Following the analysis and prediction communication processes 204 and 208, the data continues to be received and analyzed in order to detect the actual occurrence of the set of condition(s) that will trigger the "greenout" (210). Once the set of conditions actually occurs and is detected, the voluntary reduction in power consumption scheme 156 can be implemented (212). For example, a notification to this effect can be communicated to a power grid controller 130 (e.g., over the communication network 140) so that the controller 130 can automatically limit power supply to one or more of the electronic devices 120 (e.g., through the use of a switching circuit 135), according to a predetermined reduction in power consumption scheme 156 (213). Alternatively, a notification to this effect can be communicated, over the communication network 140, directly to one or more of the electronic devices 120 so that the electronic device(s) 120 themselves can automatically limit power usage, according to a predetermined reduction in power consumption scheme 156 (214). In either case, the reduction in power consumption scheme 156 can, for example, prioritize the electronic devices and further specify which electronic devices 120, during the "greenout", should be exempted from the "greenout" conditions, which should have limited power and by how much, which should have no power, etc. Optionally, the plan for voluntarily reducing overall power consumption by the electronic devices 120 may vary, according to the scheme 156, depending upon the estimated duration of the voluntary reduction in power consumption (i.e., the estimated duration of the "greenout") and/or the severity level of the "greenout".

The power management method of the present invention can further take advantage of the communication network 140 between the various system components, including the processor 150, the electronic devices 120 and the controller 130 in order to provide features not previously available with prior art "greenout" techniques. For example, by allowing communication back and forth between the various components 120, 130 and 150, particular aspects of a voluntary reduction in power consumption scheme 156 can be overridden (e.g., until such time as the appropriate preparatory or other actions are completed by the electronic device(s) 120) or even altered (215). Specifically, the method embodiments of the present invention can further comprise receiving notification(s) from the electronic device(s) 120 as to the status of compliance with the predetermined preparatory action scheme 156 (e.g., incomplete, time until completion, completed, etc.). If the status of compliance by a particular device is incomplete, the voluntary reduction in power consumption scheme can be overridden as it applies to that particular device until such time as the status is complete (e.g., until data is backed-up, until critical tasks are performed according to a rearranged schedule, until ambient temperature reaches a desired temperature, etc.). Similarly, if a task is scheduled to be performed by a particular device during a "greenout", if the task has been designated as "high priority" by a user, and if the particular device is targeted for shutdown during the "greenout", this information can be communicated, e.g., from the particular device to the processor 150 and onto the controller 130, and the controller 130 can alter the voluntary reduction in power consumption scheme 156 in order to ensure the necessary power reduction and also to ensure that the task, which was designated as high priority, is completed (e.g., by targeting a different device for shutdown).

Also disclosed herein are embodiments of a computer program product for power management. The computer program product comprises a computer usable medium having computer usable program code embodied therewith and this computer usable program code is configured to perform the above-described method embodiments. More specifically, the embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
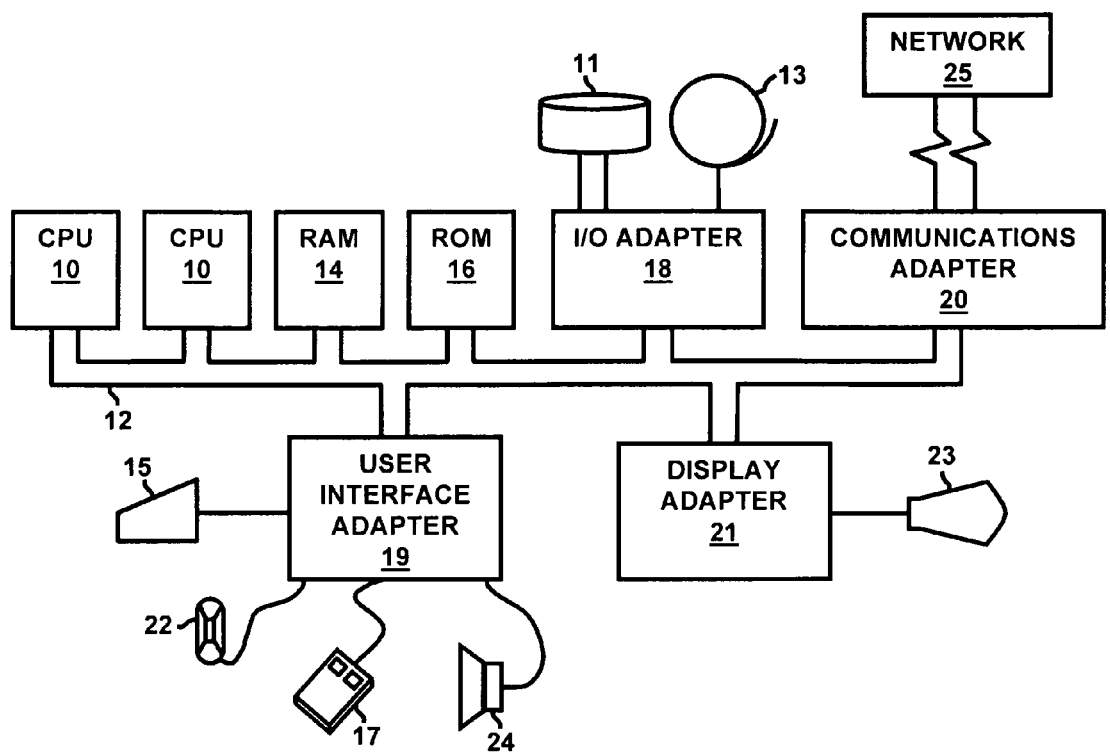
FIG. 3 is a schematic diagram illustrating an exemplary hardware environment that can be used to implement the embodiments of the invention.

A representative hardware environment for practicing the embodiments of the invention is depicted in FIG. 3. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

Finally, it should also be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

Therefore, disclosed above are embodiments of a power management system and associated method that not only initiate a "greenout" to avoid the negative impact of high loads (i.e., to avoid high power cost, negative environmental impact, brownouts, and ultimately blackouts), but can also predict the initiation of such a "greenout". Predicting the initiation of a "greenout" and communicating the prediction to one or more of the various electronic devices connected to the power grid allows the electronic device(s) to take preparatory action to avoid and/or limit any negative impact that may be caused by the "greenout". The disclosed power management system and method are designed to remove the 'human choice' factor, forcing compliance with a voluntary power consumption reduction scheme, while also allowing electronic devices connected to the power grid to 'gracefully' reduce power consumption, avoid corruption of loss of data, avoid system failure, etc. By allowing preparatory actions to be taken, critical data and applications can be maintained even in the presence of a "greenout". Such a power management system and method would provide a reliable mechanism for avoiding high power cost during peak load times, would provide a reliable mechanism for avoiding catastrophic impacts of physical power grid disturbances (e.g., brownouts or blackouts), and would also allow for the collection of data which can be used as valuable input for forecasting future power needs for grid and/or supply buildup.

What is claimed is:

1. A power management system comprising:
  a plurality of electronic devices;
  a power grid supplying power to said electronic devices;
  a processor receiving data from at least one data source and further analyzing said data in order to generate a prediction as to an occurrence, at a future time, of a set of at least one condition that will trigger a voluntary reduction in overall power consumption by said electronic devices in accordance with a predetermined voluntary reduction in power consumption scheme; and
  a communication network between said processor and said electronic devices, said processor communicating said prediction to at least one electronic device over said communication network and, upon receiving said prediction, said at least one electronic device taking at least one predetermined preparatory action in accordance with a predetermined preparatory action scheme so as to avoid a negative impact of said voluntary reduction in power consumption, said processor further receiving from said at least one electronic device a notification as to a status of compliance with said predetermined preparatory action scheme and one of overriding and altering said predetermined voluntary reduction in power consumption scheme, based on said status, to ensure completion of a user-specified high priority task.

2. The system of claim 1,
  said system further comprising a power grid controller in communication with said processor over said communication network,
  said processor further analyzing said data to detect said occurrence of said set of at least one condition and communicating said occurrence of said set of at least one condition to said controller,
  said controller further automatically limiting power supplied to said at least electronic device over said power grid in response to said occurrence in accordance with said predetermined voluntary reduction in power consumption scheme; and
  said predetermined voluntary reduction in power consumption scheme prioritizing said electronic devices and, based on electronic device priority, identifying any electronic device to be exempt from said voluntary reduction in overall power consumption, any electronic device that shall have limited power usage during said voluntary reduction in overall power consumption and any electronic device that shall have no power usage during said voluntary reduction in overall power consumption.

3. The system of claim 1, said predetermined preparatory action comprising any of the following:
  automatically backing up data in currently running applications on said electronic device to ensure that said data is not lost during said voluntary reduction in overall power consumption;
  automatically rearranging task schedules on said electronic device to ensure that critical tasks are performed by said electronic device prior to said voluntary reduction in power consumption; and
  automatically adjusting temperature control systems for said electronic device to ensure that a predetermined ambient temperature is achieved prior to said voluntary reduction in overall power.

4. The system of claim 1, said processor further analyzing said data to detect said occurrence of said set of at least one condition and automatically communicating said occurrence of said set of at least one condition to said at least one electronic device so that said at least one electronic device can automatically limit power usage, in accordance with said predetermined voluntary reduction in power consumption scheme.

5. The system of claim 1, said prediction further comprising a time until said occurrence of said set of at least one condition and an estimated duration of said set of at least one condition, said predetermined preparatory action varying depending on at least one of said time and said estimated duration.

6. The system of claim 1,
said at least one data source comprising monitors, forecasters and a historical database,
said monitors monitoring at least current temperatures across said power grid and load on said power grid,
said forecasters forecasting at least future temperatures across said power grid and future loads on said power grid, and
said historical database indicating at least power grid reliability as a function of temperature and load.

7. A power management system comprising:
a plurality of electronic devices;
a power grid supplying power to said electronic devices;
a processor receiving data from at least one data source and further analyzing said data in order to generate a prediction as to an occurrence, at a future time, of a set of at least one condition that will trigger a particular severity level of voluntary reduction in overall power consumption by said electronic devices in accordance with a predetermined voluntary reduction in power consumption scheme that associates different severity levels with different triggering conditions: and
a communication network between said processor and said electronic devices, said processor selecting at least one electronic device, depending upon said particular severity level, and communicating said prediction to said at least one electronic device over said communication network and, upon receiving said prediction, said at least one electronic device taking at least one predetermined preparatory action in accordance with a predetermined preparatory action scheme so as to avoid a negative impact of said voluntary reduction in power consumption, said processor further receiving from said at least one electronic device a notification as to a status of compliance with said predetermined preparatory action scheme and one of overriding and altering said predetermined voluntary reduction in power consumption scheme, based on said status, to ensure completion of a user-specified high priority task.

8. The system of claim 7,
said system further comprising a power grid controller in communication with said processor over said communication network,
said processor further analyzing said data to detect said occurrence of said set of at least one condition and communicating said occurrence of said set of at least one condition to said controller,
said controller further automatically limiting power supplied to said at least electronic device over said power grid in response to said occurrence in accordance with said predetermined voluntary reduction in power consumption scheme, and depending on said particular severity level,
said predetermined voluntary reduction in power consumption scheme prioritizing said electronic devices and, based on electronic device priority, identifying any electronic device to be exempt from said voluntary reduction in overall power consumption, any electronic device that shall have limited power usage during said voluntary reduction in overall power consumption and any electronic device that shall have no power usage during said voluntary reduction in overall power consumption.

9. The system of claim 7, said predetermined preparatory action comprising any of the following:
automatically backing up data in currently running applications on said electronic device to ensure that said data is not lost during said voluntary reduction in overall power consumption;
automatically rearranging task schedules on said electronic device to ensure that critical tasks are performed by said electronic device prior to said voluntary reduction in overall power consumption; and
automatically adjusting temperature control systems for said electronic device to ensure that a predetermined ambient temperature is achieved prior to said voluntary reduction in overall power.

10. The system of claim 7, said processor further analyzing said data to detect said occurrence of said set of at least one condition and automatically communicating said occurrence of said set of at least one condition to said at least one electronic device so that said at least one electronic device can automatically limit power usage, in accordance with said predetermined voluntary reduction in power consumption scheme, and depending on said particular severity level.

11. The system of claim 7, said prediction further comprising a time until said occurrence of said set of at least one condition and an estimated duration of said set of at least one condition, said predetermined preparatory action varying depending on at least one of said time and said estimated duration.

12. The system of claim 7, said at least one data source comprising monitors, forecasters and a historical database,
said monitors monitoring at least current temperatures across said power grid and load on said power grid,
said forecasters forecasting at least future temperatures across said power grid and future loads on said power grid,
said historical database indicating at least power grid reliability as a function of temperature and load, and
said analysis being performed using an adapted prediction scheme.

13. A power management method comprising:
receiving data from at least one data source regarding a power grid that supplies power to a plurality of electronic devices;
analyzing said data in order to generate a prediction as to an occurrence, at a future time, of a set of at least one condition that will trigger a voluntary reduction in overall power consumption by said electronic devices in accordance with a predetermined voluntary reduction in power consumption scheme;
communicating said prediction to at least one electronic device;
taking, by said at least one electronic device upon receiving said prediction, at least one predetermined preparatory action in accordance with a predetermined preparatory action scheme so as to avoid a negative impact of said voluntary reduction in power consumption; and
receiving a notification from said at least one electronic device as to a status of compliance with said predetermined preparatory action scheme and one of overriding and altering a voluntary reduction in power consumption scheme, based on said status, to ensure completion of a user-specified high priority task.

14. The method of claim 13, further comprising further analyzing said data to detect said occurrence of said set of at least one condition and communicating said occurrence of said set of at least one condition to a power grid controller so that said controller can automatically limit power supply to said at least electronic device in accordance with said predetermined voluntary reduction in power consumption scheme.

15. The method of claim 13, further comprising further analyzing said data to detect said occurrence of said set of at least one condition and communicating said occurrence of said set of at least one condition to said at least one electronic device so that said at least one electronic device can automatically limit power usage in accordance with said predetermined voluntary reduction in power consumption scheme.

16. The method of claim 13, said predetermined voluntary reduction in power consumption scheme prioritizing said electronic devices and, based on electronic device priority, identifying any electronic device to be exempt from said voluntary reduction in overall power consumption, any electronic device that shall have limited power usage during said voluntary reduction in overall power consumption and any electronic device that shall have no power usage during said voluntary reduction in overall power consumption.

17. The method of claim 13, said prediction further comprising a time until said occurrence of said set of at least one condition and an estimated duration of said set of at least one condition, said predetermined preparatory action varying depending on said time and on said estimated duration.

18. The method of claim 13, said predetermined preparatory action comprising any of the following:
automatically backing up data in currently running applications on said electronic device to ensure that said data is not lost during said voluntary reduction in overall power consumption;
automatically rearranging task schedules on said electronic device to ensure that critical tasks are performed by said electronic device prior to said voluntary reduction in power consumption; and
automatically adjusting temperature control systems for said electronic device to ensure that a predetermined ambient temperature is achieved prior to said voluntary reduction in overall power.

19. The method of claim 13, said at least one data source comprising monitors, forecasters and a historical database,
said monitors monitoring at least current temperatures across said power grid and load on said power grid,
said forecasters forecasting at least future temperatures across said power grid and future loads on said power grid, and
said historical database indicating at least power grid reliability as a function of temperature and load.

20. The method of claim 13, said prediction further indicating a particular severity level of said voluntary reduction in overall power consumption and selection of said at least one electronic device to which said prediction is communicated and said predetermined preparatory action varying depending upon said particular severity level.

21. A computer program product for power management, said computer program product comprising a computer usable medium having computer usable program code embodied therewith, said computer usable program code being configured to perform a method, said method comprising:
receiving data from at least one data source regarding a power grid that supplies power to a plurality of electronic devices;
analyzing said data in order to generate a prediction as to an occurrence, at a future time, of a set of at least one condition that will trigger a voluntary reduction in overall power consumption by said electronic devices in accordance with a predetermined voluntary reduction in power consumption scheme; and
communicating said prediction to at least one electronic device so as to allow said at least one electronic device to take at least one predetermined preparatory action in response to said prediction and in accordance with a predetermined preparatory action scheme so as to avoid a negative impact of said voluntary reduction in power consumption; and
receiving a notification from said at least one electronic device as to a status of compliance with said predetermined preparatory action scheme and one of overriding and altering said predetermined voluntary reduction in power consumption scheme, based on said status, to ensure completion of user-specified high priority tasks.

* * * * *